United States Patent
Nfonguem et al.

(10) Patent No.: US 11,440,639 B2
(45) Date of Patent: Sep. 13, 2022

(54) AIRCRAFT WITH DISTRIBUTED HYDRAULIC SYSTEM

(71) Applicant: BOMBARDIER INC., Dorval (CA)

(72) Inventors: Gustave Nfonguem, Verdun (CA); Vlad Iliescu, Kirkland (CA); Avraham Ardman, Dollards-des-Ormeaux (CA)

(73) Assignee: BOMBARDIER INC., Dorval (CA)

( * ) Notice: Subject to any disclaimer, the term of this patent is extended or adjusted under 35 U.S.C. 154(b) by 251 days.

(21) Appl. No.: 15/737,922

(22) PCT Filed: Jun. 23, 2016

(86) PCT No.: PCT/IB2016/053757
§ 371 (c)(1),
(2) Date: Dec. 19, 2017

(87) PCT Pub. No.: WO2017/001984
PCT Pub. Date: Jan. 5, 2017

(65) Prior Publication Data
US 2018/0178902 A1    Jun. 28, 2018

Related U.S. Application Data

(60) Provisional application No. 62/186,613, filed on Jun. 30, 2015.

(51) Int. Cl.
*B64C 9/00* (2006.01)
*B64C 13/50* (2006.01)
(Continued)

(52) U.S. Cl.
CPC .............. *B64C 9/00* (2013.01); *B64C 5/10* (2013.01); *B64C 13/42* (2013.01); *B64C 13/504* (2018.01);
(Continued)

(58) Field of Classification Search
CPC ........ B64C 13/40; B64C 13/42; B64C 13/504; B64C 5/10; B64C 9/00; B64C 2009/005
See application file for complete search history.

(56) References Cited

U.S. PATENT DOCUMENTS

| 3,902,318 A | 9/1975 | Becker et al. |
| 5,109,672 A | 5/1992 | Chenoweth et al. |

(Continued)

FOREIGN PATENT DOCUMENTS

| EP | 2412629 A2 | 2/2012 |
| EP | 2631171 A2 | 8/2013 |

(Continued)

OTHER PUBLICATIONS

PCT international Search Report and Written Opinion dated Oct. 10, 2016 re: International Application No. PCT/IB2016/053757.
(Continued)

*Primary Examiner* — Nicholas McFall
*Assistant Examiner* — Terri L Filosi
(74) *Attorney, Agent, or Firm* — Norton Rose Fulbright Canada LLP

(57) ABSTRACT

An aircraft comprises an aircraft structure, a flight control surface attached to the aircraft structure, and a local hydraulic power pack disposed proximal to the flight control surface. The local hydraulic power pack is configured to provide pressurized hydraulic fluid for actuating the flight control surface. The local hydraulic power pack comprises a reservoir for the hydraulic fluid and two hydraulic pumps for pressurizing the hydraulic fluid.

18 Claims, 4 Drawing Sheets

(51) Int. Cl.
*B64C 5/10* (2006.01)
*B64C 13/42* (2006.01)

(52) U.S. Cl.
CPC ......... *B64C 2009/005* (2013.01); *Y02T 50/40* (2013.01)

(56) References Cited

U.S. PATENT DOCUMENTS

| | | | |
|---|---|---|---|
| 7,191,593 | B1 | 3/2007 | Ho |
| 7,870,726 | B2 | 1/2011 | Matsui |
| 8,434,301 | B2 | 5/2013 | Fukui |
| 8,490,918 | B2 | 7/2013 | Fukui |
| 8,500,063 | B2 | 8/2013 | Nakagawa et al. |
| 8,740,155 | B2 | 6/2014 | Fervel et al. |
| 10,093,408 | B1* | 10/2018 | Smith ............ B64D 41/00 |
| 2004/0075020 | A1* | 4/2004 | Trikha ............ B64C 13/505 244/99.4 |
| 2007/0114329 | A1* | 5/2007 | Lacy ............ B64C 9/16 244/34 R |
| 2011/0256000 | A1* | 10/2011 | Fukui ............ F04B 49/002 417/213 |
| 2014/0000737 | A1 | 1/2014 | Hansen et al. |
| 2014/0151501 | A1* | 6/2014 | Kondo ............ B64C 25/22 244/102 R |
| 2014/0294604 | A1 | 10/2014 | Buzzard |
| 2014/0366522 | A1* | 12/2014 | Masutani ............ F15B 15/18 60/477 |
| 2016/0052620 | A1* | 2/2016 | Hussey ............ B64C 13/40 244/227 |

FOREIGN PATENT DOCUMENTS

| | | |
|---|---|---|
| FR | 2683502 A1 | 5/1993 |
| JP | 569895 A | 3/1993 |

OTHER PUBLICATIONS

English translation of Japan patent document No. JPH0569895 dated Mar. 23, 1993, https://www33.orbit.com/?ocale=en&ticket=5387e54d-e2d7-434c-9bd2-92a09ee92b5e#PatentDocumentPage, accessed on Dec. 19, 2017.

J. Loughmiller, Emerging Technologies: Distributed Electro-Hydraulic Systems, Design News, Dec. 14, 2009, www.designnews.com/document . . . , accessed on Dec. 1, 2014.

English translation of France patent document No. FR 2683502 dated May 14, 1993, https://www33.orbit.com/?ocale=en&ticket=29fd52c0-7bee-4127-bb78-8a05d625d47c#PatentDocumentPage, accessed on Dec. 15, 2017.

* cited by examiner

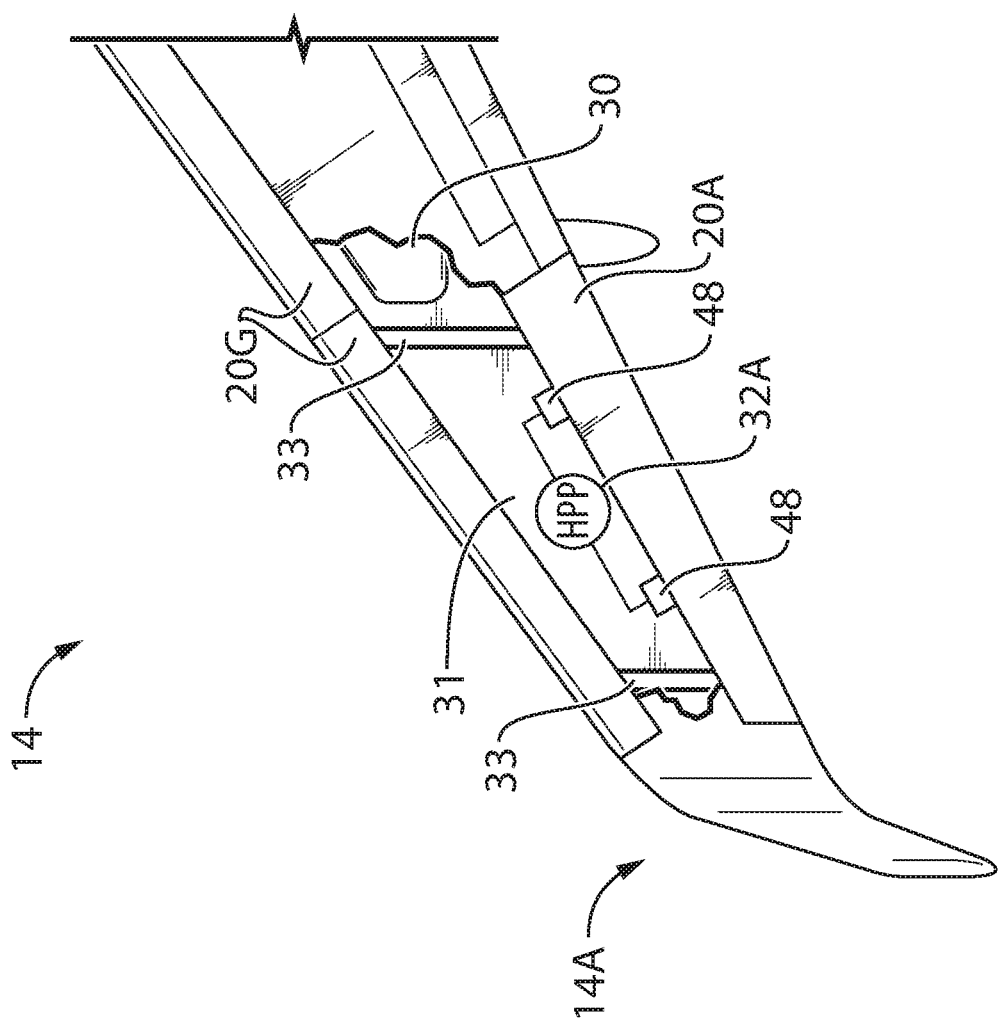

AIRCRAFT WITH DISTRIBUTED HYDRAULIC SYSTEM

CROSS-REFERENCE TO RELATED APPLICATION(S)

The present application is a national phase application under 35 U.S.C. 371 of International Patent Application No. PCT/IB2016/053757 filed on Jun. 23, 2016, which claims priority from U.S. Provisional Patent Application No. 62/186,613 filed on Jun. 30, 2015, the entire content of which is incorporated herein by reference.

TECHNICAL FIELD

The disclosure relates generally to hydraulic systems of aircraft, and more particularly to aircraft with distributed hydraulic systems including local hydraulic power packs.

BACKGROUND OF THE ART

Hydraulic systems of traditional commercial aircraft include so called centralized hydraulic systems where each centralized hydraulic system comprises a central reservoir and a power generation unit. The pressurized hydraulic fluid is carried to various parts of the aircraft by a complex hydraulic network including pipes routed through the aircraft and fluid conditioning and metering components in order to be delivered to on-board hydraulic power users including actuators for flight control surfaces, landing gears and thrust reversers, before returning to the central reservoir. For large aircraft, such centralized hydraulic systems can be relatively heavy, expensive and the hydraulic network can cause energy losses in the hydraulic fluid. Improvement is desirable.

SUMMARY

In one aspect, the disclosure describes an aircraft comprising:
an aircraft structure;
a flight control surface attached to the aircraft structure; and
a local hydraulic power pack disposed proximal to the flight control surface and configured to provide pressurized hydraulic fluid for actuating the flight control surface, the local hydraulic power pack comprising a reservoir for the hydraulic fluid and two hydraulic pumps for pressurizing the hydraulic fluid.

The flight control surface may be configured to be actuated exclusively using the pressurized hydraulic fluid from the local hydraulic power pack.

The local hydraulic power pack may be configured to combine the hydraulic fluid pressurized by both of the hydraulic pumps.

The reservoir may be a common reservoir that supplies both of the hydraulic pumps.

The hydraulic pumps may be configured to be driven by different power sources.

Each hydraulic pump may be configured to be controlled using power from a respective one of the different power sources.

The hydraulic pumps may be configured to be electrically driven by respective motors powered by different electrical power busses.

The aircraft may comprise two power and control modules where each power and control module is associated with a respective one of the motors and is powered by a respective one of the different electrical power busses.

The aircraft may comprise: a plurality of hydraulic actuators for actuating the flight control surface; and a manifold configured to receive pressurized hydraulic fluid from both hydraulic pumps and distribute the pressurized hydraulic fluid to the hydraulic actuators.

In some embodiments, none of the plurality of hydraulic actuators of the flight control surface is coupled to a central hydraulic system of the aircraft.

The aircraft structure may comprise a wing and the local hydraulic power pack may be disposed inside of the wing. The flight control surface may be an aileron.

The aircraft structure may comprise an empennage.

The local hydraulic power pack may be disposed in an aft portion of the aircraft.

The flight control surface may be an elevator.

The flight control surface may be a rudder.

In another aspect, the disclosure describes an aircraft comprising:
an aircraft structure comprises an empennage;
a plurality of flight control surfaces attached to the empennage; and
a plurality of local hydraulic power packs disposed proximal to the flight control surfaces and configured to provide pressurized hydraulic fluid for actuating the flight control surfaces, each local hydraulic power pack comprising a reservoir for the hydraulic fluid and two hydraulic pumps for pressurizing the hydraulic fluid.

The aircraft may comprise a plurality of hydraulic actuators for actuating the flight control surfaces. The plurality of flight control surfaces may comprise two elevators and a rudder. A first hydraulic actuator of a first elevator and a first hydraulic actuator of the rudder may be configured to be actuated via a first local hydraulic power pack. A second hydraulic actuator of the first elevator, a second hydraulic actuator of the rudder and a first hydraulic actuator of a second elevator may be configured to be actuated via a second local hydraulic power pack. A second hydraulic actuator of the second elevator and a third hydraulic actuator of the rudder may be configured to be actuated via a third local hydraulic power pack.

The aircraft structure may comprise a wing. The plurality of flight control surfaces may comprise an aileron and the a plurality of local hydraulic power packs may comprise a fourth local hydraulic power pack configured to provide pressurized hydraulic fluid for actuating the aileron. The fourth local hydraulic power pack may be disposed inside of the wing.

The first, second and third local hydraulic power packs may be disposed in an aft portion of the aircraft.

In some embodiments, none of the plurality of hydraulic actuators is coupled to a central hydraulic system of the aircraft.

Each local hydraulic power pack may be configured to combine the hydraulic fluid pressurized by both of its hydraulic pumps.

The two hydraulic pumps of each local hydraulic power pack may be driven by different power sources.

Each of the two hydraulic pumps may be configured to be controlled using power from a respective one of the different power sources.

The two hydraulic pumps of each local hydraulic power pack may be configured to be electrically driven by different motors powered by different electrical power busses.

The aircraft may comprise a power and control module associated with each of the motors and powered by a respective one of the different electrical power busses.

Further details of these and other aspects of the subject matter of this application will be apparent from the detailed description and drawings included below.

DESCRIPTION OF THE DRAWINGS

Reference is now made to the accompanying drawings, in which:

FIG. 1B shows a top plan view of a portion of a wing of the aircraft of FIG. 1 including a cutaway portion showing an exemplary hydraulic power pack for actuating an aileron;

DETAILED DESCRIPTION

This disclosure relates to aircraft with distributed hydraulic systems. In various embodiments, the distributed hydraulic system disclosed herein may comprise one or more local hydraulic power packs (also known as hydraulic power units) that may be disposed proximal to the applicable power user(s). In various embodiments, the use of a distributed hydraulic system as disclosed herein may eliminate the need for a centralized hydraulic system in an aircraft. In comparison with a traditional centralized hydraulic system, the use of one or more local hydraulic power packs in a distributed hydraulic system may, in some situations, result in improvements in efficiency, reduction in the complexity of hydraulic networks, weight reduction, the alleviation of some certification issues (e.g. hydraulic system survival in case of events such as rotor burst, tire and/or wheel problems), and/or, alleviation of system manufacturing and installation (e.g. reduction in the number of hydraulic pipes, their joining and attachment to the structure of aircraft 10). In some embodiments, the use of a distributed system may provide an adequate level of redundancy for some applications. In some embodiments, the use of a distributed system instead of a traditional centralized system may provide an overall cost reduction.

Aspects of various embodiments are described through reference to the drawings.

Figure 1A:
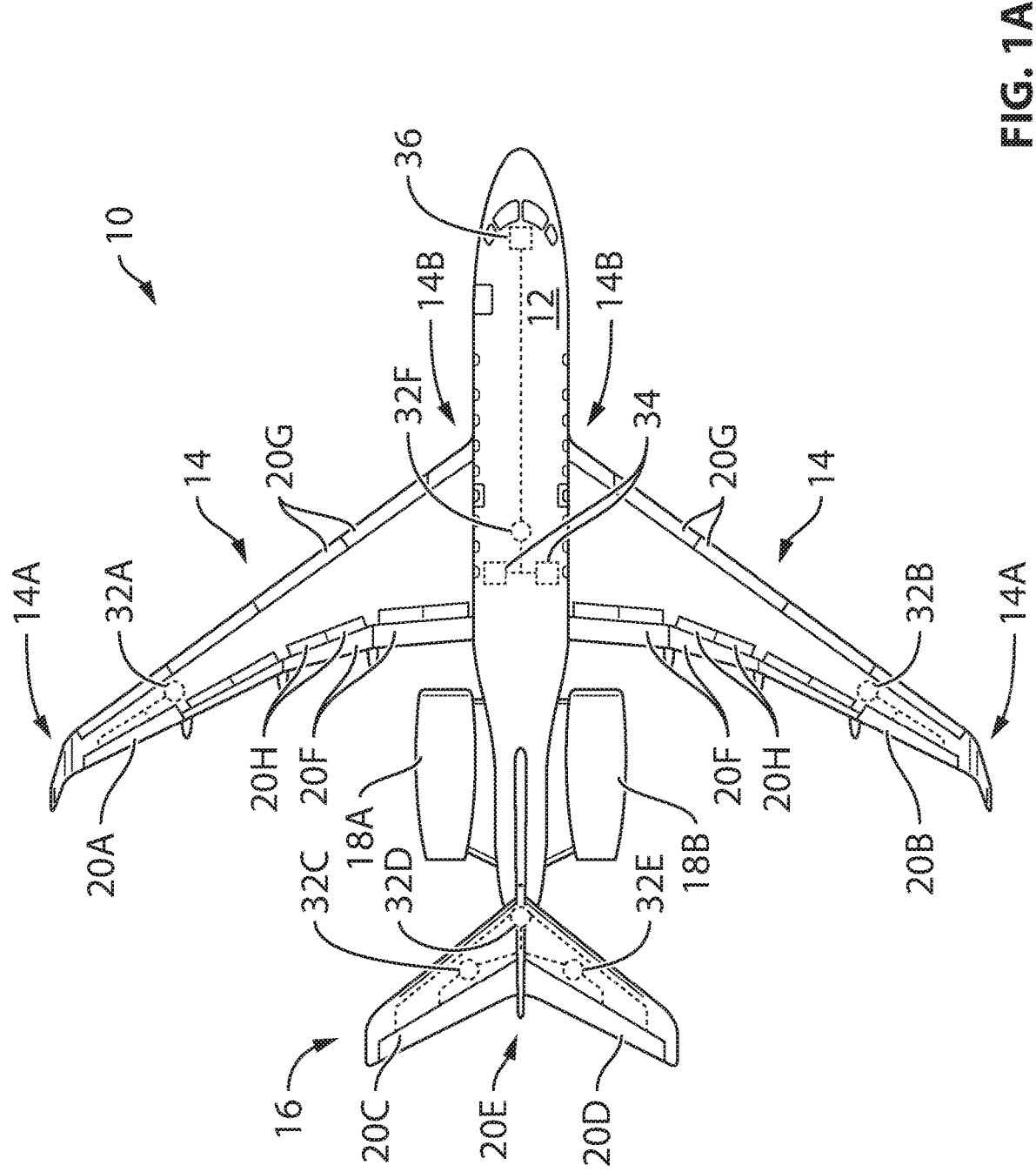
FIG. 1A shows a top plan view of an exemplary aircraft comprising a distributed hydraulic system shown in schematic form.

FIG. 1A shows a top plan view of an exemplary aircraft 10 comprising a distributed hydraulic system shown in schematic form and overlaid thereon. Aircraft 10 may be a fixed-wing aircraft. Aircraft 10 may be any suitable aircraft such as corporate, private, commercial or any other type of aircraft. For example, aircraft 10 may be a narrow-body, twin engine jet airliner.

Aircraft 10 may comprise an aircraft structure including fuselage 12, one or more wings 14 and empennage 16. Aircraft 10 may comprise one or more engines 18A, 18B mounted to the aircraft structure. In various embodiments of aircraft 10, one or more of engines 18A, 18B may be mounted to wings 14 and/or to fuselage 12. Wings 14 may comprise wing tips 14A and wing roots 14B.

One or more flight control surfaces 20 (e.g., 20A-20H) may be movably attached to the aircraft structure. Such flight control surfaces 20 may be actuatable (e.g., adjustable) in order to permit control of the movement of aircraft 10 during flight. Some of flight control surfaces 20 may be primary flight control surfaces that may be used to control rotation of aircraft 10 about the longitudinal axis, the lateral or transverse axis, and the vertical axis of aircraft 10. For example, aircraft 10 may comprise one or more ailerons 20A, 20B as primary flight control surface(s) for controlling rotation about the longitudinal axis (i.e., roll); aircraft 10 may comprise one or more elevators 20C, 20D as primary flight control surface(s) for controlling rotation about the lateral or transverse axis (i.e., pitch); and, aircraft 10 may comprise one or more rudders 20E as primary flight control surface(s) for controlling rotation about the vertical axis (i.e., yaw). Aircraft 10 may comprise other flight control surfaces such as one or more flaps 20F, one or more slats 20G and/or one or more spoilers 20H.

The distributed hydraulic system of aircraft 10 may comprise one or more local hydraulic power packs (HPPs) 32A-32F (referred generically as "32") disposed in close proximity to their respective flight control surface(s) 20 or other hydraulic power user(s) which they may serve. For example, HPP 32 may be disposed as close as practically possible to its respective hydraulic power user(s) based on the space available for HPP 32 in aircraft 10 in the region of the hydraulic power user in question. HPP 32 may be configured to provide pressurized hydraulic fluid for actuating one or more flight control surfaces 20. In various embodiments one or more HPPs 32 may be disposed in regions of aircraft 10 that are not pressurized during flight.

FIG. 1B shows a top plan view of a portion of wing 14 of aircraft 10 including a cutaway portion showing HPP 32A for providing pressurized hydraulic fluid for actuating aileron 20A. For example, HPPs 32A, 32B may be disposed inside respective wings 14 and may be configured to provide pressurized hydraulic fluid for actuating ailerons 20A, 20B respectively and/or other flight control surface(s) 20 attached to wings 14. HPPs 32A, 32B may be disposed closer to tip 14A than root 14B of respective wings 14 such as, for example, at a location outboard of one or more fuel tanks 30 inside wings 14 depending on the space available inside wings 14 to accommodate HPPs 32A, 32B. In some embodiments, each of HPPs 32A, 32B may be located in a same structural bay 31 between two structural ribs 33 as actuator(s) 48 (see also FIG. 2) associated with respective ailerons 20A, 20B. It is understood that specific distances between HPPs 32A, 32B and their respective actuator(s) 48 will depend on the size and configuration of aircraft 10. For example, in one embodiment, HPPs 32A, 32B may be disposed between about 40 inches (1 m) and about 55 inches (1.4 m) from actuator(s) 48 associated with their respective ailerons 20A, 20B depending on the space available inside wing 14 to accommodate HPPs 32A, 32B.

HPPs 32C, 32D and 32E may be disposed in an aft portion of aircraft 10 and may be configured to provide pressurized hydraulic fluid for actuating elevators 20C, 20D and rudder 20E. For example, one or more of HPPs 32C, 32D and 32E may be disposed inside empennage 16 (e.g., horizontal stabilizer and/or vertical stabilizer). In various embodiments, HPPs 32C, 32D and 32E may be disposed in close proximity to elevators 20C, 20D and rudder 20E depending on the space available inside the aft portion of aircraft 10 to accommodate HPPs 32C, 32D and 32E. For example, each of HPPs 32C, 32D and 32E may be located in a same structural bay (i.e., the space between two ribs) as actuator (s) 48 associated with a respective one of elevators 20C, 20D and rudder 20E. Again, it is understood that specific distances between HPPs 32C, 32D and 32E and their respective actuator(s) 48 will depend on the size and configuration of aircraft 10. For example, in one embodiment, HPP 32D may be disposed between about 25 inches (0.6 m) and about 30 inches (0.8 m) from actuator(s) 48 associated with rudder 20E, and, HPPs 32C and 32E may be disposed between about 31 inches (0.8 m) and about 34 inches (0.9 m) from actuator(s) 48 associated with their respective elevators 20C, 20D. For example, HPPs 32C and 32E may be disposed about 160 inches (4 m) from HPP 32D.

HPP 32F may be disposed inside fuselage 12 of aircraft 10 and may be configured to provide pressurized hydraulic fluid to one or more actuators 34 associated with a main landing gear of aircraft 10 and/or one or more actuators 36 associated with a nose landing gear of aircraft 10. For example, one or more actuators 36 may be configured to deploy/retract the nose landing gear and one or more actuators 36 may be configured to power the nose wheel steering. Again, it is understood that specific distances between HPPs 32F and its respective actuator(s) 48 will depend on the size and configuration of aircraft 10. For example, in one embodiment, HPP 32F may be disposed about 450 inches (11.4 m) from actuator(s) 36 associated with the nose landing gear and about 57 inches (1.4 m) from actuator(s) 34 associated with the main landing gear.

The use of HPPs 32A-32F may eliminate the need for one or more traditional centralized hydraulic systems on aircraft 10. In some embodiments, the pressurized hydraulic fluid supplied to various power users associated with respective HPPs 32 may be supplied exclusively by their respective HPPs 32 so that reliance on a centralized hydraulic system is not required. For example, aileron 20A may be actuated exclusively via HPP 32A and aileron 20B may be actuated exclusively via HPP 32B. The hydraulic actuators 48 (see FIG. 2) associated with ailerons 20A, 20B, elevators 20C, 20D and rudder 20E may not be coupled to receive pressurized hydraulic fluid from a centralized hydraulic system in any situation so that aircraft 10 may not comprise a traditional centralized hydraulic system.

Figure 2:
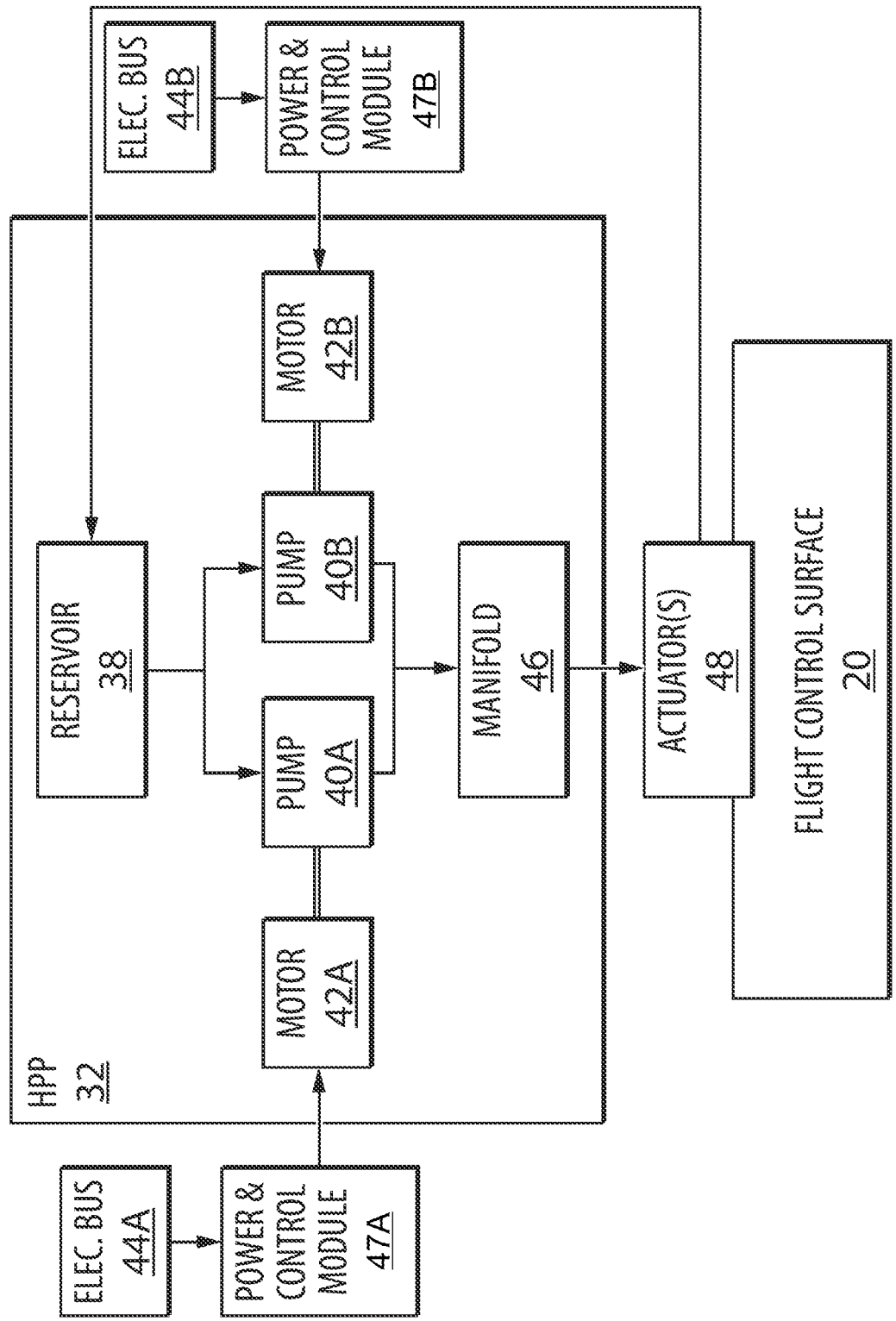
FIG. 2 shows a schematic representation of an exemplary local hydraulic power pack of the distributed hydraulic system of FIG. 1A for actuating a flight control surface of the aircraft of FIG. 1A.

FIG. 2 shows a schematic representation of an exemplary local HPP 32 of the distributed hydraulic system of FIG. 1A for actuating an exemplary flight control surface 20. Local HPPs 32 may be considered self-contained hydraulic power generation units that integrate in a single package typical components required to perform the hydraulic power generation function. HPP 32 may comprise reservoir 38 for the hydraulic fluid and two or more pumps 40A, 40B for pressurising the hydraulic fluid. Reservoir 38 may be a common reservoir that supplies both hydraulic pumps 40A, 40B. HPP 32 may be configured to combine the hydraulic fluid pressurized by both hydraulic pumps 40A, 40B so that the flow of pressurized hydraulic fluid supplied by the two pumps 40A, 40B may be combined (i.e., summed) before the pressurized hydraulic fluid is delivered to the hydraulic power user(s).

Pumps 40A, 40B may be independently driven by separate electric motors 42A, 42B, which may be independently controlled. The separate electric motors 42A, 42B may be powered by different respective electrical power busses 44A, 44B that may be available on aircraft 10. Accordingly, pumps 40A, 40B may be powered from different power sources. For example, electrical bus 44A may be powered by an electric generator driven by engine 18A and electrical bus 44B may be powered by a different electric generator driven by engine 18B of aircraft 10. The pressurized hydraulic fluid produced by HPP 32 (i.e., delivered by pumps 40A, 40B) may be received into manifold 46 and delivered to one or more actuators 48 for actuating the flight control surface 20. HPP 32 may comprise or be coupled to one or more power and control modules 47A, 47B that may be configured to carry out control, monitoring and/or power conditioning functions according to known or other methods for electric motors 42A, 42B. In some embodiments, each electric motor 42A, 42B may have its own dedicated power and control module 47A, 47B. In some embodiments, each power and control module 47A or 47B may be powered by the same electrical bus 44B or 44A which is used to power electric motor 42A, 42B associated with the specific power and control module 47A, 47B. HPP 32 may also comprise or may be coupled to other components not shown herein such as suitable hydraulic fluid conditioning components such as heat exchanger(s) and hydraulic fluid filter(s).

Actuator(s) 48 may comprise hydraulic rams integrated into hydraulic power control units (PCUs) of known or other types for actuating the applicable flight control surface 20. Actuator(s) 48 may be connected to HPP 32 via a suitable pressure line and return line to permit hydraulic fluid to be returned to reservoir 38. HPP 32 and/or PCUs incorporating actuators 48 may be coupled to a flight control system of aircraft 10 for control and monitoring purposes. In various embodiments, flight control surface 20 may be actuated via a single or a plurality of (e.g., two or more) actuators 48. In some embodiments, each HPP 32 may be dedicated to supplying pressurized hydraulic fluid for the actuation of a single flight control surface 20 (i.e., one or more actuators 48 for a single flight control surface 20). Alternatively, one or more HPPs 32 may be dedicated to supplying pressurized hydraulic fluid for the actuation of a plurality of flight control surfaces 20 disposed in relatively close proximity to each other in a region of aircraft 10.

Figure 3:
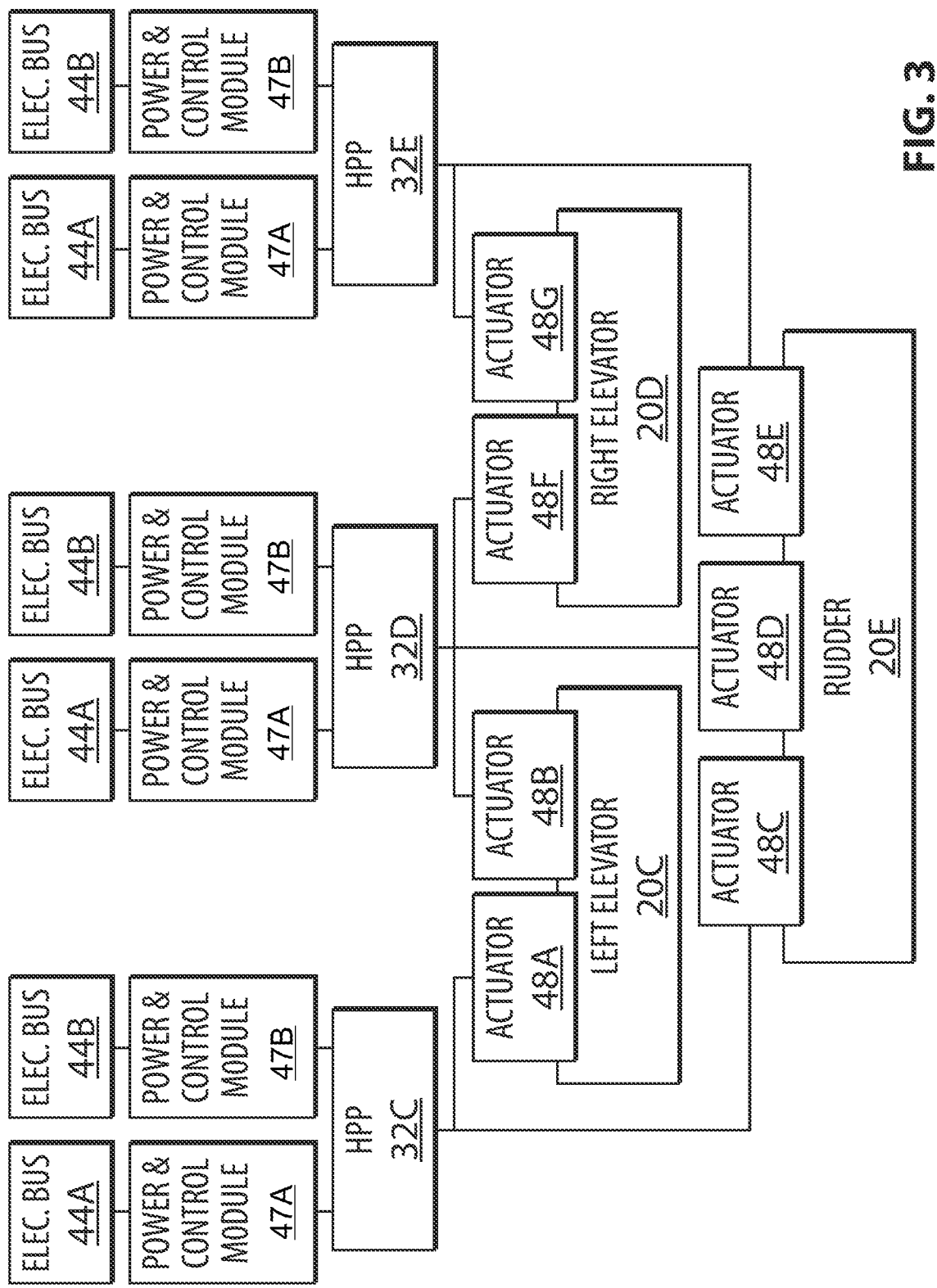
FIG. 3 shows a schematic representation of three exemplary local hydraulic power packs of the distributed hydraulic system of FIG. 1A for actuating two elevators and a rudder of the aircraft of FIG. 1A.

FIG. 3 shows a schematic representation of three exemplary local HPPs 32C, 32D, 32E of the distributed hydraulic system of FIG. 1A for actuating two elevators 20C, 20D and rudder 20E attached to empennage 16 of aircraft 10. HPPs 32C, 32D, 32E may have a configuration as illustrated in FIG. 2. Left elevator 20C may have two actuators 48A, 48B associated therewith. Right elevator 20D may have two actuators 48F, 48G associated therewith. Rudder 20E may have three actuators 48C-48E associated therewith. HPPs 32C, 32D, 32E may be disposed in an aft portion of aircraft 10 so as to be proximal to elevators 20C, 20D and rudder 20E.

Local HPPs 32C, 32D, 32E may be configured to supply pressurized fluid for the actuation of elevators 20C, 20D and rudder 20E in a redundant manner which may be in accordance with aircraft performance and safety requirements. For example, hydraulic actuator 48A of left elevator 20C and hydraulic actuator 48C of rudder 20E may be configured to be actuated via local HPP 32C. Hydraulic actuator 48B of left elevator 20C, hydraulic actuator 48D of rudder 20E and hydraulic actuator 48F of right elevator 20D may be configured to be actuated via local HPP 32D. Hydraulic actuator 48G of right elevator 20D and hydraulic actuator 48E of rudder 20E may be configured to be actuated via local HPP 32E.

During operation, one or more flight control surfaces 20 may be actuated using pressurized hydraulic fluid from one or more local HPPs 32 without reliance on a central hydraulic system. Accordingly, aircraft 10 may not require a centralized hydraulic system of the traditional type. For example, in the case of a single HPP 32 being associated with a single flight control surface 20, the presence of two pumps 40A, 40B in HPP 32 may provide sufficient functional redundancy for some applications. During some mode(s) of operation of HPP 32, both pumps 40A, 40B may be active and operate to supply pressurized hydraulic fluid. Accordingly, the flow of hydraulic fluid from pumps 40A, 40B may be combined (i.e., summed). Alternatively, in some mode(s) of operation only one a pumps 40A, 40B may be active and operate to supply pressurized hydraulic fluid. Pumps 40A, 40B may be configured to operate in active-active or active-standby modes of operation.

In the event of a fault or failure detected with one of pumps 40A, 40B, the pump 40A or 40B in question may be shut down. Each pump 40A, 40B may be sized to provide sufficient capacity of pressurized hydraulic fluid on its own to permit acceptable actuation of the associated flight control surface 20 in case of a failure of one pump 40A or 40B in some situations. Even though the failure of one pump 40A or 40B may result in a performance degradation, the remaining pump 40A or 40B may be sufficient to actuate flight control surface 20 during a single pump failure or during an emergency condition. For example, the loss of one pump 40A or 40B may result in a lower maximum speed of actuation of the associated flight control surface(s) 20 that is still acceptable in such a failure case. As explained above, a flight control surface 20 may be actuated using pressurized hydraulic fluid from a single HPP 32 or a flight control surface 20 may be actuated using pressurized hydraulic fluid from a plurality of HPPs 32 as shown in FIG. 3 in order to provide a desired or required level of redundancy in case of partial failure(s) or of the complete failure of an entire HPP 32 for example.

The use of local HPP 32 in a distributed hydraulic system instead of a traditional central hydraulic system may require a lower overall energy consumption. For example, traditional central hydraulic systems are typically operated continuously so as to maintain a minimum pressure and capacity of pressurized hydraulic fluid available to the various hydraulic pressure users that are connected thereto. Conversely, local HPPs 32 may be individually and independently activated or controlled on an on-demand basis (e.g., depending on the phase of flight) so that they may produce pressurized hydraulic fluid at the required pressure only as needed to actuate the respective flight control surface 20. For example, in some embodiments, HPPs 32 may be operated at reduced capacity during times when a reduced amount of pressurized hydraulic fluid or a reduced pressure level is required from HPPs 32. During a cruise phase of flight of aircraft 10 for example, a lower response time for the actuation of flight control surface(s) 20 may be suitable so that an operating pressure of an associated HPP 32 may be set to a lower value and/or one of pumps 40A, 40B may be turned off so as to reduce electrical power consumption during that time.

Due to the close proximity of HPPs 32 to their respective power users, a complex and long network of hydraulic pipes typically found in traditional centralized systems may not be required. Accordingly, power losses in the pressurized hydraulic fluid associated with long lengths of hydraulic pipes may be (e.g., significantly) reduced in some situations. Also, the overall weight of a distributed hydraulic system may be lower than a traditional hydraulic system due to the reduced quantity of hydraulic fluid that may be required in some situations due to the elimination of the long lengths of hydraulic pipes, their attachments and supporting structure associated with traditional centralized hydraulic systems. The reduction in complexity with a distributed hydraulic system in comparison with a centralized system may also reduce the risk of hydraulic fluid leakages and associated repairs, and, may consequently reduce the complexity of automated diagnostic and health monitoring systems. The reduction in complexity may consequently reduce installation and maintenance costs and improve dispatchability.

With respect to safety, the ability to isolate a hydraulic fluid leakage may be improved. Also, in comparison with a centralized hydraulic system where a leakage at any level could affect the whole centralized hydraulic system thus leading to the loss of a number of power users, a leakage associated with one HPP 32 may not necessarily affect the other HPPs 32 in a distributed hydraulic system thus the number of lost power users may be reduced.

It is understood that the advantages mentioned herein will depend on the specific situation. For example, some of the advantages explained herein may be more relevant to larger aircraft. It is also understood that any advantages mentioned or implied herein may not necessarily apply to every embodiment disclosed herein.

The above description is meant to be exemplary only, and one skilled in the relevant arts will recognize that changes may be made to the embodiments described without departing from the scope of the invention disclosed. The present disclosure may be embodied in other specific forms without departing from the subject matter of the claims. Also, one skilled in the relevant arts will appreciate that while the aircraft, systems, devices and assemblies disclosed and shown herein may comprise a specific number of elements/components, the aircraft, systems, devices and assemblies could be modified to include additional or fewer of such elements/components. The present disclosure is also intended to cover and embrace all suitable changes in technology. Modifications which fall within the scope of the present invention will be apparent to those skilled in the art, in light of a review of this disclosure, and such modifications are intended to fall within the appended claims. Also, the scope of the claims should not be limited by the preferred embodiments set forth in the examples, but should be given the broadest interpretation consistent with the description as a whole.

What is claimed is:

1. An aircraft comprising:
   an aircraft structure;
   a plurality of flight control surfaces attached to the aircraft structure;
   a plurality of local hydraulic power packs providing pressurized hydraulic fluid for actuating two separate flight control surfaces of the plurality of flight control surfaces, each local hydraulic power pack comprising a reservoir for the hydraulic fluid and two hydraulic pumps for pressurizing the hydraulic fluid; and
   a plurality of hydraulic actuators for actuating the two separate flight control surfaces,
   wherein:
      a combined flow of hydraulic fluid from the two hydraulic pumps provides the pressurized hydraulic fluid for actuating the two separate flight control surfaces;
      none of the plurality of hydraulic actuators of the two separate flight control surfaces is coupled to a central hydraulic system of the aircraft;
      at least one of the plurality of flight control surfaces is actuated using pressurized hydraulic fluid from at least two of the plurality of local hydraulic power packs;
      in a first of the plurality of local hydraulic power packs, the hydraulic pumps are configured to be electrically driven by respective motors powered by different electrical power busses powered by different respective engines of the aircraft; and the aircraft comprises two power and control modules where each power and control module is associated with a respective one of the motors and is powered by a respective one of the different electrical power busses.

2. The aircraft as defined in claim 1, wherein the first of the plurality of local hydraulic power packs is configured to combine the hydraulic fluid pressurized by both of the hydraulic pumps.

3. The aircraft as defined in claim 1, wherein in the first of the plurality of local hydraulic power packs, the reservoir is a common reservoir that supplies both of the hydraulic pumps.

4. The aircraft as defined in claim 1, comprising a manifold configured to receive pressurized hydraulic fluid from both hydraulic pumps of the first of the plurality of local hydraulic power packs and distribute the pressurized hydraulic fluid to the hydraulic actuators.

5. The aircraft as defined in claim 1, wherein the aircraft structure comprises a wing and the first of the plurality of local hydraulic power packs is disposed inside of the wing.

6. The aircraft as defined in claim 5, wherein the first local hydraulic power pack is disposed outboard of one or more fuel tanks disposed inside the wing.

7. The aircraft as defined in claim 1, wherein the two separate flight control surfaces include an aileron.

8. The aircraft as defined in claim 1, wherein the aircraft structure comprises an empennage.

9. The aircraft as defined in claim 8, wherein the first of the plurality of local hydraulic power packs is disposed in the empennage.

10. The aircraft as defined in claim 8, wherein the two separate flight control surfaces include an elevator.

11. The aircraft as defined in claim 8, wherein the two separate flight control surfaces include a rudder.

12. The aircraft as defined in claim 1, wherein the first of the local hydraulic power packs is disposed in a region of the aircraft that is not pressurized during flight.

13. An aircraft comprising:
an aircraft structure comprising an empennage;
a plurality of flight control surfaces attached to the empennage;
a plurality of local hydraulic power packs configured to provide pressurized hydraulic fluid for actuating the flight control surfaces, each local hydraulic power pack comprising a reservoir for the hydraulic fluid and two hydraulic pumps for pressurizing the hydraulic fluid; and
a plurality of hydraulic actuators for actuating the flight control surfaces,
wherein:

a combined flow of hydraulic fluid from the two hydraulic pumps provides the pressurized hydraulic fluid for actuating one of the flight control surfaces;
none of the plurality of hydraulic actuators is coupled to a central hydraulic system of the aircraft; and
at least one of the plurality of flight control surfaces is actuated using pressurized hydraulic fluid from at least two of the plurality of the plurality of local hydraulic power packs;
the two hydraulic pumps of each local hydraulic power pack are configured to be electrically driven by different motors powered by different electrical power busses powered by different respective engines of the aircraft; and
the aircraft comprises a power and control module associated with each of the motors and powered by a respective one of the different electrical power busses.

14. The aircraft as defined in claim 13, wherein:
the plurality of flight control surfaces comprises a first elevator, a second elevator and a rudder; and
the plurality of hydraulic actuators includes:
a first hydraulic actuator of the first elevator and a first hydraulic actuator of the rudder configured to be actuated via a first of the plurality of local hydraulic power packs;
a second hydraulic actuator of the first elevator, a second hydraulic actuator of the rudder and a first hydraulic actuator of the second elevator configured to be actuated via a second of the plurality of local hydraulic power packs; and
a second hydraulic actuator of the second elevator and a third hydraulic actuator of the rudder are configured to be actuated via a third of the plurality of local hydraulic power packs.

15. The aircraft as defined in claim 14, wherein:
the aircraft structure comprises a wing; and
the plurality of local hydraulic power packs comprises a fourth local hydraulic power pack configured to provide pressurized hydraulic fluid for actuating an aileron of the aircraft, the fourth local hydraulic power pack being disposed inside of the wing.

16. The aircraft as defined in claim 14, wherein the first, second and third local hydraulic power packs are disposed in an aft portion of the aircraft.

17. The aircraft as defined in claim 13, wherein each local hydraulic power pack is configured to combine the hydraulic fluid pressurized by both of its hydraulic pumps.

18. The aircraft as defined in claim 13, wherein the local hydraulic power packs are disposed inside the empennage.

* * * * *